May 15, 1962 R. P. O'DONNELL 3,034,167
WINDSHIELD WIPERS
Filed Nov. 23, 1959

INVENTOR.
Raymond P. O'Donnell
BY
*William J. Ruano*
ATTORNEY 3,034,167
WINDSHIELD WIPERS
Raymond P. O'Donnell, 11 Jackson St., Dallas, Pa.
Filed Nov. 23, 1959, Ser. No. 854,691
2 Claims. (Cl. 15—250.29)

This invention relates to windshield wipers and, more particularly, to windshield wipers that will wipe the entire surface area of an automobile, or other vehicle, windshield so as to greatly improve visibility during rain or snow.

An outstanding disadvantage of conventionally used automobile windshield wipers is that they wipe only very small areas of the windshield, leaving appreciable parts of the windshield covered with rain or snow, thereby impairing visibility and making driving somewhat dangerous during inclement weather.

Although attempts have been made in the past to cover large portions of the area of a windshield by redesigning the action of wiper blades, such attempts have not met with success since the resulting apparatus has involved carriages and other complicated pieces of equipment mounted on the windshield thus impairing visibility and considerably adding to the cost.

An object of my invention is to provide a novel windshield wiper which is devoid of the above named disadvantages and which will effectively wipe the entire surface area of an automobile windshield without the necessity of motive parts on the windshield which obstruct vision or detract from the appearance of the automobile.

Other objects and advantages will become more apparent from a study of the following description taken with the accompanying drawings wherein:

FIG. 2a is an enlarged, fragmentary view of one of the operating mechanisms or oscillating drives shown in FIG. 1a;

FIG. 3a is an enlarged, vertical, cross-sectional view taken along line III—III of FIG. 2a;

FIG. 4a is an enlarged, fragmentary view partly in cross section of a portion of a structure shown in FIGS. 2a and 3a; and FIG. 5a is an enlarged, cross-sectional view of part 16a.

Figure 1A:
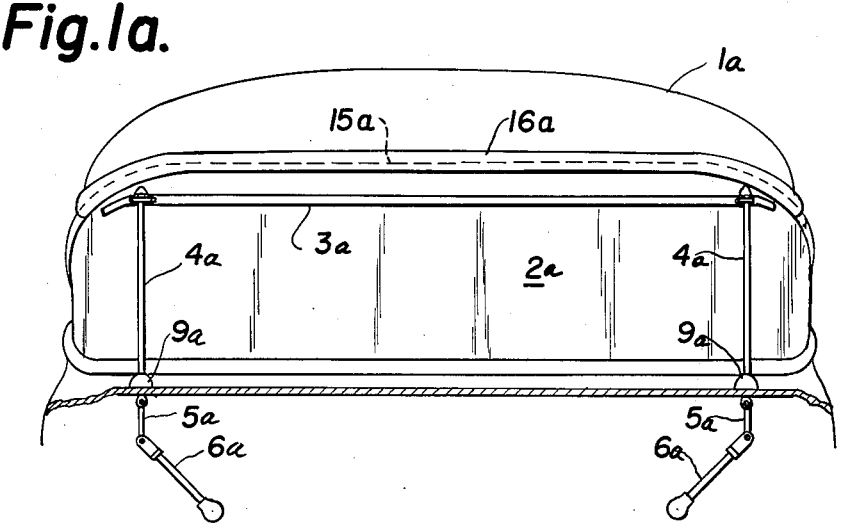
FIG. 1a is a front, elevational view of a windshield wiper embodying the present invention in which the blade has vertical motion.
Figure 2A:
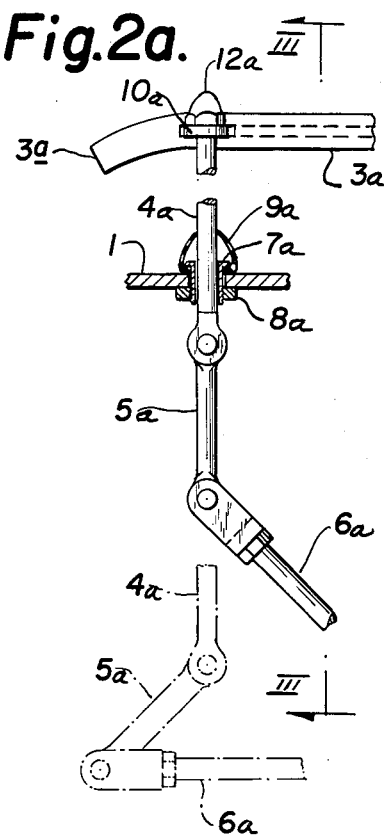
Figure 3A:
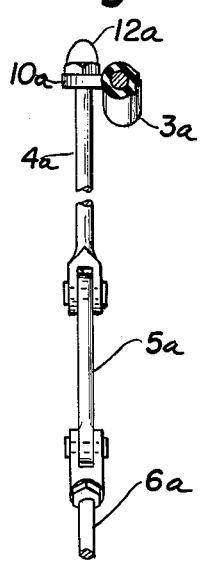
Figure 4A:
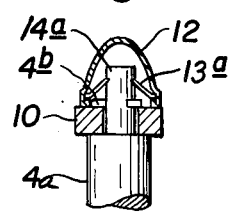

FIGS. 1a to 4a inclusive show an automobile 1a having a windshield 2a on which is mounted an elongated windshield wiper 3a which is adapted for vertical movement as distinguished from horizontal movement. At each side of the windshield there is mounted a substantially vertically reciprocable arm 4a which is pivotally connected to link 5a which, in turn, is pivotally connected to a lever 6a. Lever 6a is oscillated by any suitable source of power, such as an electric or vacuum motor, or suitable drive mechanism of any well known type and forming no part of the present invention. Link 5a and lever 6a are preferably mounted underneath the hood, rod 4a extending through a hole formed in the hood to allow vertical sliding movement in relation to the hood. To prevent entry of water through such hole, a cap 9a of rubber or other flexible material is provided which is held in place by means of a threaded sleeve 7a and nut 8a assembly.

The top end of rod 4a is rigidly secured to a lug 10a integrally formed on and projecting from the metal core portion of the wiper blade 3a. Cap 12a is slipped over a projecting portion 14a of rod 4a and is held rigidly with respect to slots therein by means of flexible leaves 13a which may be similar to a tinnerman washer for locking the cap 12a relative to rod 4a. Of course, other suitable means may be provided instead for rigidly securing the top of rod 4a to the end portion of wiper blade 3a.

In operation, arms 6a oscillate in opposite directions, simultaneously, so as to reciprocate rods 4a vertically downwardly and upwardly in unison and in so doing will move the wiper blades 3a vertically so as to wipe the entire area of the windshield. Sealing caps 9a will prevent entry of rain by providing a water-tight seal with the sliding rods 4a.

Figure 5A:
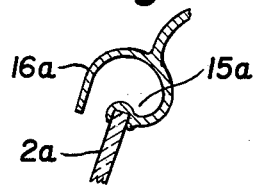

FIG. 5a is a cross-sectional view taken through the visor or shield 16a and showing an integral gutter portion 15a for collecting and draining rainwater pushed into it by wiper 3a at its upper limit of travel. Since the gutter has a slight downward taper from the center to its ends the rainwater therein will drain from the end portions. The shield tapers back at both ends as shown. The gutter may empty into the roof drainage channels located above the doors, if desired, or the ends may be provided with beadings to prevent rain from blowing back or drain at window level, but to make it drain at door level.

Thus it will be seen that I have provided an efficient windshield wiper having vertical motion and which is devoid of auxiliary parts, such as carriages, which would otherwise obstruct the driver's view through the windshield; furthermore, I have provided a novel windshield wiper operating mechanism which is of relatively simple construction involving a minimum number of inexpensive and simple parts, therefore which will considerably reduce manufacturing costs.

While I have illustrated and described a single embodiment of my invention, it will be understood that these are by way of illustration only, and that various changes and modifications may be made within the contemplation of my invention and within the scope of the following claims.

I claim:

1. In combination with an automotive vehicle having a windshield, a windshield wiper extending horizontally along substantially the entire horizontal length of the windshield, a pair of substantially vertically extending rods having top end portions secured to the end portions of said windshield wiper, a pair of oscillatable arms mounted under the hood of the vehicle and including linkage connections projecting through holes in said hood, a stationary rubber cap mounted on each of said arms and immediately above said holes to provide a leak-proof connection between said rods and said hood, whereby upon simultaneous oscillation of said arms in opposite directions, said rods will be reciprocated vertically to effect vertical sweeping motion of said windshield wiper across substantially the entire area of said windshield, and a gutter mounted immediately above said windshield having a trough portion recessed inwardly of the top of the windshield, which is cooperable with said wiper so that upon the limit of the upward stroke of said wiper, liquid wiped thereby will be discharged into said gutter and drained.

2. In combination with an automotive vehicle having a windshield, a windshield wiper extending horizontally along substantially the entire horizontal length of the windshield, a pair of substantially vertically extending rods having top end portions secured to the end portions of said windshield wiper, a pair of oscillatable arms connected to said rods, means for oscillating said arms so as to intermittently raise and lower said rods in unison to reciprocate said wiper vertically, and a gutter extending inwardly along the top edge of said windshield and having ends bent around the end portions of the windshield which are at a lower level than the central portion of the gutter so that liquid wiped upwardly by the wiper will be caught by and drained to the end portions of said gutter.

References Cited in the file of this patent

UNITED STATES PATENTS

| | | |
|---|---|---|
| 2,131,341 | Waters | Sept. 27, 1938 |
| 2,264,465 | Vollett | Dec. 2, 1941 |
| 2,677,844 | McGlasson | May 11, 1954 |
| 2,759,213 | Trotta | Aug. 21, 1956 |
| 2,829,394 | Brigmon | Apr. 8, 1958 |
| 2,880,444 | Barenyi | Apr. 7, 1959 |